US008366398B1

(12) United States Patent
Kimmel

(10) Patent No.: US 8,366,398 B1
(45) Date of Patent: Feb. 5, 2013

(54) MULTIPLE PIECE TURBINE BLADE/VANE

(75) Inventor: Keith D Kimmel, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 508 days.

(21) Appl. No.: 12/795,796

(22) Filed: Jun. 8, 2010

(51) Int. Cl.
*B64C 11/20* (2006.01)

(52) U.S. Cl. ....................................................... 416/226

(58) Field of Classification Search ................... 416/226
See application file for complete search history.

(56) References Cited

U.S. PATENT DOCUMENTS

| | | | | |
|---|---|---|---|---|
| 7,080,971 | B2 * | 7/2006 | Wilson et al. | 416/92 |
| 7,670,116 | B1 * | 3/2010 | Wilson et al. | 416/226 |
| 2008/0260538 | A1 * | 10/2008 | Wilson et al. | 416/97 R |
| 2009/0169395 | A1 * | 7/2009 | Wilson et al. | 416/97 R |

* cited by examiner

*Primary Examiner* — Edward Look
*Assistant Examiner* — William Grigos
(74) *Attorney, Agent, or Firm* — John Ryznic

(57) ABSTRACT

An air cooled turbine blade or vane of a spar and shell construction with the shell made from a high temperature resistant material that must be formed from an EDM process. The shell and the spar both have a number of hooks extending in a spanwise direction and forming a contact surface that is slanted such that a contact force increases as the engaging hooks move away from one another. The slanted contact surfaces on the hooks provides for an better seal and allows for twisting between the shell and the spar while maintaining a tight fit.

5 Claims, 2 Drawing Sheets

MULTIPLE PIECE TURBINE BLADE/VANE

GOVERNMENT LICENSE RIGHTS

This invention was made with Government support under contract number DE-FG02-07ER84668 awarded by Department of Energy. The Government has certain rights in the invention.

CROSS-REFERENCE TO RELATED APPLICATIONS

None.

BACKGROUND OF THE INVENTION

1. Field of the Invention

The present invention relates generally to gas turbine engine, and more specifically for a multiple piece air cooled turbine blade or vane.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The first and second stage airfoils (blades and vanes) must be cooled by passing cooling air through internal cooling passages and discharging the cooling air through film cooling holes to provide a blanket layer of cooling air to protect the hot metal surface from the hot gas stream.

Higher turbine inlet temperatures can be used if the first stage turbine airfoils can be made from certain high temperature resistant metals such as tungsten, molybdenum or columbium. However, these metals have such high melting temperatures that they cannot be cast using the standard investment casting process which have a temperature limit of around 3,000 degrees F. the furnace, the dies and the liquid metal pouring devices used to cast the parts are all limited to this temperature. Also, these metals are very hard and therefore cannot be machined using standard metal machining processes. Thus, a thin wall airfoil cannot be formed from investment casting or standard metal machining processes.

BRIEF SUMMARY OF THE INVENTION

An air cooled turbine rotor blade or vane formed of multiple pieces with a thin wall shell secured to a spar to form the turbine blade or vane. The shell can be formed from a high temperature resistant material such as tungsten (for vanes), molybdenum or columbium (for blades or vanes) using a wire EDM process to cut the shell from a block of the material. the shell includes hooks that extend inward and engage with similar shaped hooks that extend out from the spar to secure the shell to the spar against outward deflections and chordwise shifting of the shell with respect to the spar. The hooks from the shell and the spar both include slanted surfaces that make contact. These slanted surfaces allow for the shell to move with respect to the spar while maintaining a tight fit and a effective seal. The slanted contact surfaces of the hooks allow for the shell to conform to any twisting of the spar or shell and allows for slight bulging of the shell from the spar while maintaining the tight fit and seal.

The hooks extend in a spanwise direction along the pressure side and suction side of the airfoil. The hooks on the shell can also be cut using the wire EDM process when the shell is being formed from a block of the metal material.

DETAILED DESCRIPTION OF THE INVENTION

Figure 1:
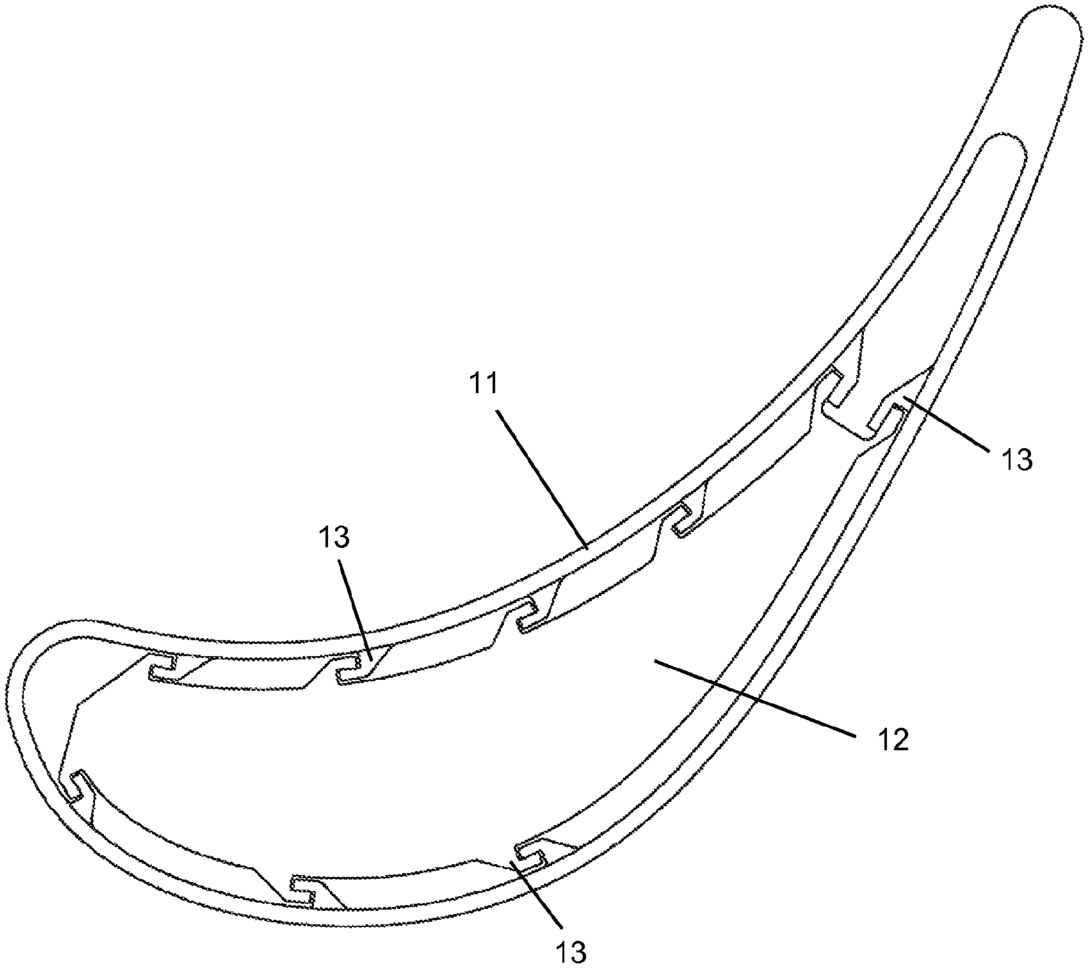
FIG. 1 shows a cross section view of the multiple piece turbine blade or vane of the present invention.

A turbine blade or vane for a gas turbine engine, especially for a large frame industrial gas turbine engine, includes a shell secured to a spar through a number of hooks that extend from both the shell and the spar. FIG. 1 shows a cross section view from a cut-away section of the assembled blade or vane. The blade or vane includes a shell 11 having an airfoil shape with a leading edge and a trailing edge with a pressure side wall and a suction side wall extending between the two edges to form the airfoil for the blade or vane. The shell 11 is made from a high temperature resistant material (higher than the nickel super alloys currently used) such as tungsten (for vanes), molybdenum or columbium (for both blades and vanes) in order to allow for higher turbine inlet temperatures. These high temperature resistant materials are also referred to as refractory materials. To form a thin wall shell from one of these materials, a wire EDM (electric discharge machining) process is used to cut the shell from a block of this material.

Figure 2:
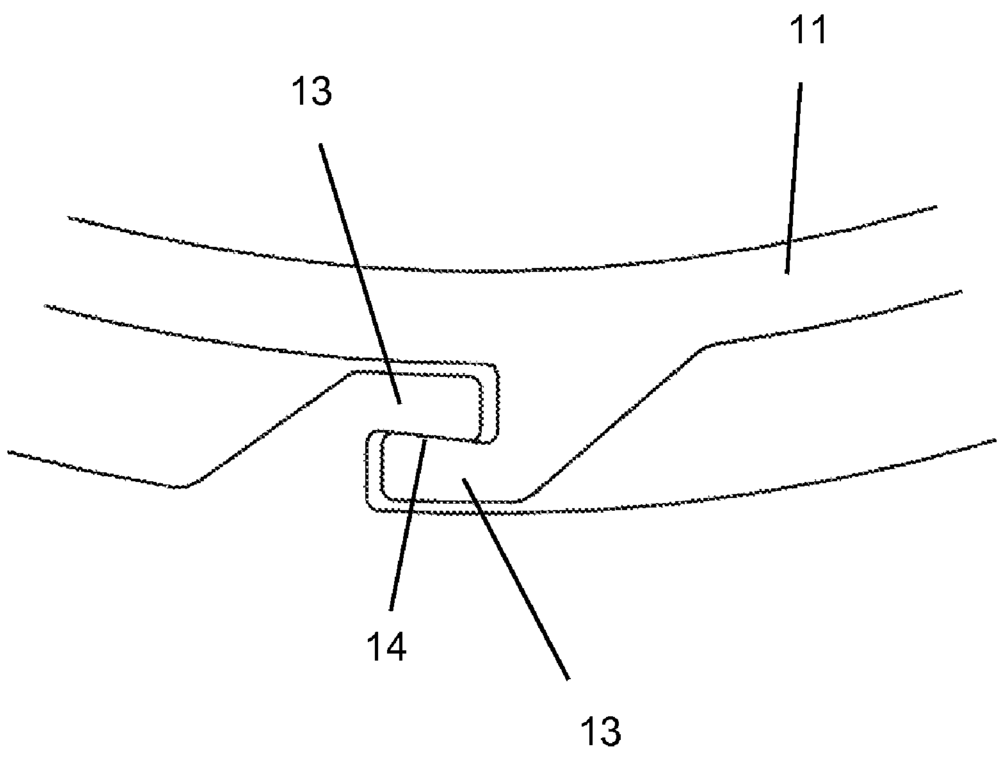
FIG. 2 shows a cross section detailed view of one of the hooks that connect the shell to the spar of the present invention in FIG. 1.

The shell 11 and the spar 12 both have a number of hooks 13 that extend in a spanwise (radial) direction of the airfoil. The hooks 13 from the shell engage with the hooks 13 from the spar to secure the shell to the spar. The spar 12 and the spar hooks 13 can be made from conventional materials such as the nickel super alloys using the investment casting process and standard metal machining processes if needed. The shell 11 and the shell hooks 13 are formed as a single piece and cut using the wire EDM process because of the material used. The hooks 13 from the shell 11 and the spar 12 are all formed with a slanted contact surface 14 as seen in FIG. 2 and extend substantially parallel to the airfoil surface. The slanted contact surfaces 14 are slanted such that the contact force increases as the opposed hooks move away from one another. The slanted contact surfaces 14 allow for shifting of the shell with respect to the spar while maintaining a tight fit between them and also to keep a tight seal since cooling air will be passed along the spaces formed between adjacent hooks 13. The slanted contact surfaces 14 also allow for twisting of the shell 11 with respect to the spar 12 while maintaining a tight fit. Also, the hooks 14 allow for the shell to bulge out from the spar due to high cooling air pressures within the space between adjacent hooks while maintaining the tight fit between the shell 11 and the spar 12.

In the FIG. 1 embodiment, all of the hooks on the spar 12 extend toward the trailing edge. In another embodiment, the hooks in the forward region can extend toward the leading edge while the hooks in the aft region can extend toward the trailing edge. In another embodiment, one of the hooks on the pressure side and the suction side can be facing the opposite direction than the remaining hooks on both sides (P/S and S/S) walls of the spar. A similar arrangement of hooks on the shell would be required for proper alignment of hooks from the spar.

I claim the following:

1. A turbine airfoil comprising:

a spar having a hook extending outward;

a shell having an airfoil shape with a leading edge and a trailing edge with a pressure side wall and a suction side wall both extending between the two edges;

the shell having a hook extending from the shell to engage the hook extending from the spar; and, the hooks both have a slanted contact surface such that a contact force increases as the two hooks move away from one another.

2. The turbine airfoil of claim 1, and further comprising:

the hooks on the shell and the spar extend in a spanwise direction of the airfoil.

3. The turbine airfoil of claim 1, and further comprising:

the shell is a thin walled shell made from a refractory material.

4. The turbine airfoil of claim 1, and further comprising:

the shell and the hook are formed as a single piece.

5. The turbine airfoil of claim 1, and further comprising:

the hooks extend substantially the entire spanwise length of the shell.

* * * * *